United States Patent
Manigatter et al.

(10) Patent No.: US 9,539,747 B2
(45) Date of Patent: Jan. 10, 2017

(54) METHOD AND APPARATUS FOR PROCESSING OF LIQUID SILICONE COMPOUNDS IN INJECTION MOULDING MACHINES AND TOOLS

(71) Applicant: ELAST KUNSTSTOFFVERARBEITUNGS-GMBH & CO. KEG, Heiligenberg (AT)

(72) Inventors: Kurt Manigatter, Alkoven (AT); Karl Adlesgruber, Allhaming (AT); Paul Fattinger, Heiligenberg (AT); Christian Reslhuber, Niederneukirchen (AT)

(73) Assignee: ELAST KUNSTSOFFVERABEITUNGS-GMBH & CO. KEG, Heligenberg (AT)

( * ) Notice: Subject to any disclaimer, the term of this patent is extended or adjusted under 35 U.S.C. 154(b) by 693 days.

(21) Appl. No.: 13/909,867

(22) Filed: Jun. 4, 2013

(65) Prior Publication Data

US 2013/0320597 A1    Dec. 5, 2013

(30) Foreign Application Priority Data

Jun. 4, 2012  (AT) .......................... GM 50051/2012

(51) Int. Cl.
  *B29C 35/08* (2006.01)
  *B29C 45/00* (2006.01)
  *B29C 45/03* (2006.01)
  *B29K 83/00* (2006.01)
  *B29C 33/00* (2006.01)

(52) U.S. Cl.
  CPC ....... *B29C 45/0001* (2013.01); *B29C 35/0888* (2013.01); *B29C 45/03* (2013.01); *B29C 2033/0005* (2013.01); *B29C 2035/0827* (2013.01); *B29K 2083/005* (2013.01)

(58) Field of Classification Search
  CPC ................... B29C 35/0805; B29C 2035/0827; B29C 45/1615; B29C 2045/1621; B29C 33/06; B29C 45/0001
  See application file for complete search history.

(56) References Cited

U.S. PATENT DOCUMENTS

| | | | | |
|---|---|---|---|---|
| 2,941,934 A * | 6/1960 | Anspon | ..................... | C08F 2/46 250/504 R |
| 5,236,970 A * | 8/1993 | Christ | ................... | A61L 27/446 523/113 |
| 5,746,967 A * | 5/1998 | Hoy | ..................... | B29C 35/0888 264/102 |
| 5,885,514 A * | 3/1999 | Tensor | ................ | B29C 35/0888 264/259 |
| 6,184,330 B1 * | 2/2001 | Currie | .................... | C08G 77/06 524/860 |
| 2003/0197307 A1 * | 10/2003 | Kitamura | ............ | B29C 45/0416 264/255 |
| 2004/0245677 A1 * | 12/2004 | Marple | ................... | B29C 33/36 264/496 |
| 2007/0069424 A1 * | 3/2007 | Veilleux | ............. | A63B 37/0003 264/328.6 |

* cited by examiner

*Primary Examiner* — Galen Hauth
(74) *Attorney, Agent, or Firm* — Jordan IP Law, LLC; Todd A. Vaughn

(57) ABSTRACT

An apparatus and a method for processing liquid, light-activatable silicone materials of low viscosity by way of injection-molding technology, and an injection-molding machine operating in accordance with the method, in which the cross-linking of the silicone material is activated by the effect of ultraviolet and/or visible radiation.

14 Claims, 4 Drawing Sheets

12/13

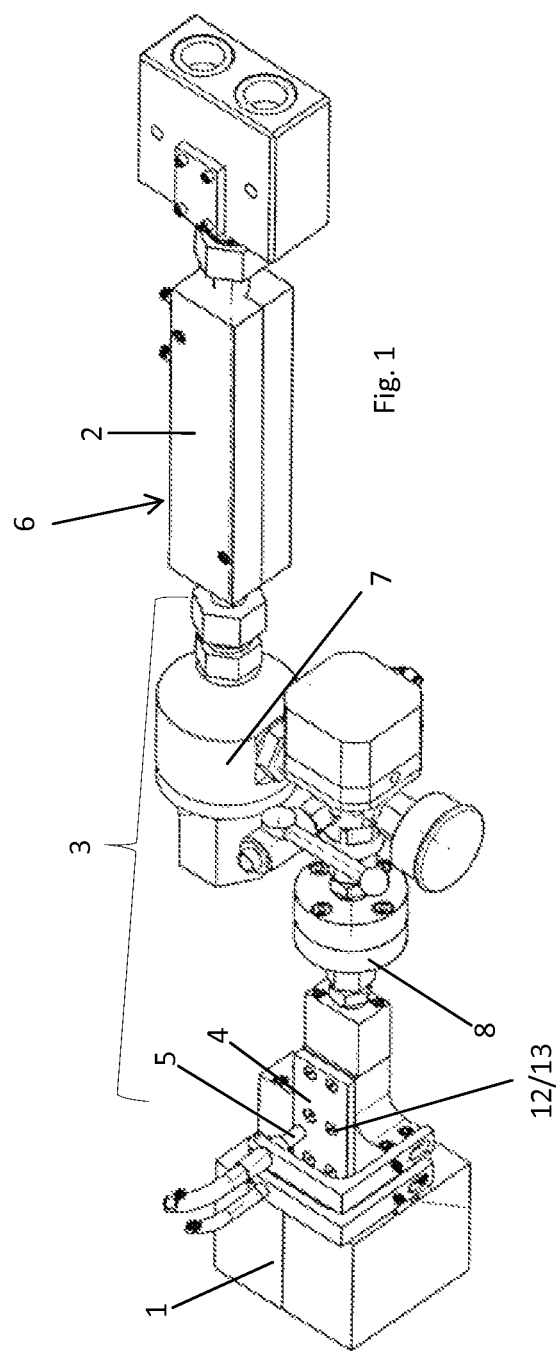
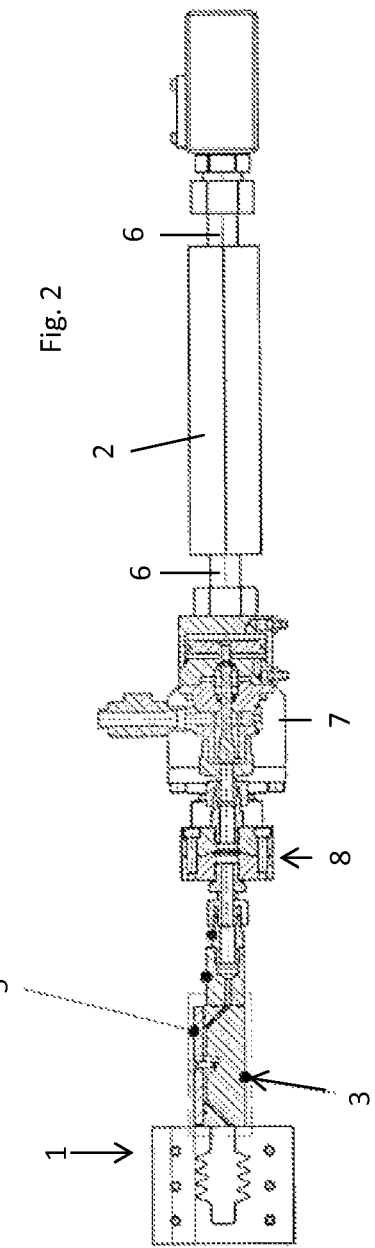

METHOD AND APPARATUS FOR PROCESSING OF LIQUID SILICONE COMPOUNDS IN INJECTION MOULDING MACHINES AND TOOLS

The present application claims priority under 35 U.S.C. §119 to Austrian Patent Application No. GM 50051/2012 (filed on (Jun. 4, 2012), which is hereby incorporated by reference in its entirety.

TECHNICAL FIELD

Embodiments of the invention relate to an apparatus and a method for processing liquid, light-activatable silicone materials of low viscosity by way of injection-molding technology, and an injection-molding machine operating in accordance with the method, in which the cross-linking of the silicone material is activated by the effect of ultraviolet and/or visible radiation.

BACKGROUND

Injection-molding machines require unambiguously reproducible production conditions for a smooth, fully automated production sequence. In the case of the liquid silicone technology (LSR=liquid silicone rubber) known since approximately 1980, the low-viscosity silicone rubber components are admixed with one another using suitable dosing and mixing units and vulcanized in the injection-molding method at elevated temperature in the mold cavity. This technology allows high cycle rates due to the short cross-linking duration. However, this technology has the disadvantage that there is a high power demand for the temperature increase for the vulcanization.

A further disadvantage results from the circumstance that many thermoplastic materials tend to deform at elevated temperature because of their nature and due to this circumstance, heretofore connecting a hard, thermoplastic plastic with a soft, permanently elastic silicone plastic by way of injection-molding methods was not possible without quality losses. Due to the development of light-activatable LSR materials, for which a separate temperature supply is not necessary for the cross-linking thereof in the mold cavity, novel possibilities have now resulted for solving the previous problems in the injection-molding processing of LSR materials.

Light-activatable polymer compositions, in particular silicone compositions, have been known for some years. Thus, for example, DE 10 2008 000 156 A1 describes a hydrosilylation reaction activatable by radiation, in which silicone products which can be cross-linked by radiation using UV light or using visible light are produced. Furthermore, EP 1 817 372 describes a siloxane composition activatable by irradiation with light, which allows the production of thick-walled molded articles containing fillers and/or pigments. Further silicone compositions which can be cross-linked by irradiation with visible light or with UV rays are known from U.S. Pat. No. 4,699,802, EP 0 146 307, U.S. Pat. No. 6,376,569 and WO 92/10544.

Furthermore, devices having transparent windows for irradiation of light-activatable polymers are known from the prior art. Thus, for example, U.S. Pat. No. 5,401,155 describes a metal mold having a light-transmissive window, which is arranged perpendicularly to a light source. A two-part mold for the production of lenticular plastic products from light-curing polymer material, in which one mold half consists of light-transmissive material, is known from U.S. Pat. No. 6,627,124. WO 2011/101269 describes a mold cavity made of two transparent walls having UV lamps arranged behind each of them.

Activating light-activatable silicone rubber compositions using UV light immediately before they are injected into the mold cavity is also known, wherein the light dose and the irradiation time, and also the remaining transport distance and the transport speed have to be adapted in such a manner that the curing only occurs in the mold cavity, but not already before the silicone rubber composition enters this mold cavity.

All of these methods, however, have the disadvantage that the irradiated plastic composition is carried out without any monitoring of the temperature control. However, the reaction profile of photoactivated cross-linking processes is always dependent on the temperature of the starting material at the point in time of the photoactivation or the beginning of the cross-linking, respectively, wherein the temperature dependence of the cross-linking speed is dependent on the specific composition of the starting material and its additives, of course.

SUMMARY

Embodiments relate to a method and an injection-molding device which operates in accordance with the method for the injection-molding of liquid, light-activatable silicone materials of low viscosity with reduced power consumption and higher cycle rate, which possibly also allows a high-quality bond between LSR and thermoplastic materials.

Embodiments further relate to an injection-molding machine which allows the production of molded thermoplastic materials and the at least partial sheathing thereof with LSR in a two-stage work cycle.

In accordance with embodiments, a method includes at least one of: controlling the temperature of the liquid, light-activatable silicone material depending on its composition; cross-linking the liquid, light-activatable silicone material by ultraviolet and/or visible radiation before the liquid, light-activatable silicone material enters a mold cavity, wherein the ultraviolet and/or the visible light originates from radiation sources which are arranged: (i) inside pocket holes in a transparent material of the mold cavity; and/or (ii) a feed line to the mold cavity; and/or (iii) inside passages which are closed on one side in the mold cavity and/or in the feed line to the mold cavity, wherein the radiation sources are led in close proximity to the silicone material.

In accordance with embodiments, an apparatus includes at least one of: a mold cavity; a feed line fluidically connected at one end to one or more storage containers for the liquid, low-viscosity silicone material and at another end to the mold cavity; a temperature control unit to control the temperature of the liquid, light-activatable silicone material, wherein at least a part of the mold cavity and/or at least a part of the feed line comprises a transparent material, and one or more radiation sources configured to provide ultraviolet or visible light are provided inside pocket holes in the transparent material, or the mold cavity.

In accordance with embodiments, an injection-molding machine includes at least one of: a mold cavity; a feed line fluidically connected at one end to one or more storage containers for the liquid, low-viscosity silicone material and at another end to the mold cavity; a temperature control unit to control the temperature of the liquid, light-activatable silicone material, wherein at least a part of the mold cavity and/or at least a part of the feed line comprises a transparent material, and one or more radiation sources configured to provide ultraviolet or visible light are provided inside pocket holes in the transparent material, or the mold cavity.

DRAWINGS

Embodiments are described by way of example below with reference to the drawings.

FIG. 1 illustrates a diagonal view of a possible embodiment of the device in accordance with embodiments of the invention.

FIG. 2 illustrates a side view of the device of FIG. 1, in which the device is illustrated in section from the temperature control unit up to the mold cavity for better recognizability of essential details.

DESCRIPTION

Figure 3:
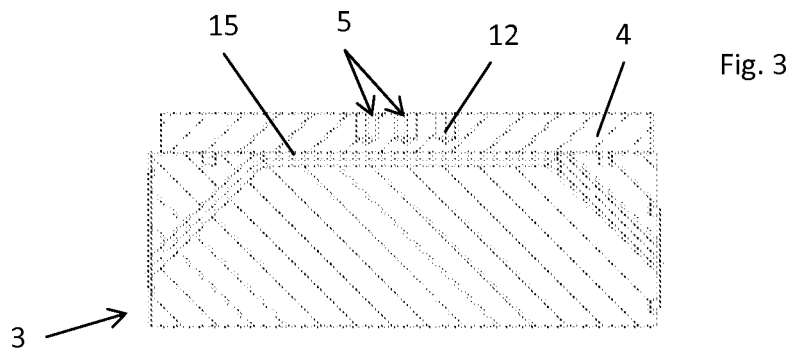
FIG. 3 illustrates a detail view of FIG. 2 in an enlarged illustration.

As illustrated in FIG. 1, the device in accordance with embodiments of the invention is composed of a mold cavity 1, a temperature control unit 2, and a feed line 3 between the mold cavity 1 and the temperature control unit 2. At least a part of the mold cavity 1 and/or at least a part of the feed line 3 is composed of a transparent material 4. One or more radiation sources 5 for ultraviolet or visible light are provided inside pocket holes 12 in the transparent material 4. By way of the formation of the pocket holes 12, in which the light-emitting radiation sources 5 are inserted nearly up to the stop, the distance to be radiated through in the transparent material 4 is substantially reduced, and thus, a better yield of the light intensity is achieved. In this embodiment variant, a distance to be radiated through remains in the transparent material 4. Depending on the application and formation of the transparent material 4, the distance to be radiated through can be in a range of between 0.5 and 25 mm, in exceptional cases also more than this.

Through targeted presetting of the temperature of the LSR starting material in the temperature control unit 2, the cycle time can be substantially reduced during the photoactivated curing of the LSR starting material inside the mold cavity 1. Thus, it could be established in experiments that it is possible in relation to the known methods for radiation cross-linking of LSR from the prior art to reduce the cycle time enough that one to six times higher output is achievable in the same time unit.

The temperature control unit 2 can have a passage channel for the silicone material having an installed static mixer or the temperature control unit 2 can be arranged around a static mixer 6. Additional units for pressure regulation, for example, material pressure limiters 7 and optionally screen adapters 8 for separating out non-liquid or viscous components in the silicone material can be provided in the feed line 3 to the mold cavity 1.

In order to optimize the light activation of the temperature-controlled starting material, it has proven to be advantageous to widen and flatten out the region 3 of the feed line which directly adjoins the mold cavity 1, wherein at least a part of the flattened region of the feed line 3 is manufactured from a transparent material 4, which has pocket holes 12, in which the ultraviolet and/or visible light is emitted, which activates the silicone material for its subsequent cross-linking in the mold cavity. In order to illustrate this better, in particular this region of the feed line 3 was illustrated in section of FIG. 2.

Especially this flattened part of the feed line 3 is illustrated separately and enlarged in FIG. 3. It has proven to be advantageous if the thickness to be radiated through of the temperature-controlled starting material in a passage channel 15 in the widened region 3 is not more than 6 mm, but preferably not more than 3 mm.

The transparent material 4 is preferably manufactured from a polycarbonate or a polymethyl methacrylate. Polycarbonates are inexpensive to produce, highly transparent to ultraviolet and visible light, easy to process, and have sufficient temperature stability for this intended use.

If at least a part of the mold cavity 1 is manufactured from transparent material 4, it has been illustrated in experiments that the mold cavity surface is excessively smooth for good removability of the cured silicone material here. In order to remedy this problem, the shaping surface of the transparent material 4 in the mold cavity 1 was slightly roughened, wherein the roughness according to VDI in a range from between 21 ra to 27 ra was already sufficient to allow very good removability of the cured preform. It has been illustrated that the light yield, i.e., the activation speed of the silicone material through the rough, milky surface of the transparent polycarbonate mold cavity part has decreased somewhat in this roughness region. This reduction of the light yield is more than compensated for in comparison to embodiments of the related art, however, by the arrangement of the light-emitting point of the radiation source 5 inside a pocket hole 12.

In contrast, it is not absolutely necessary to also roughen the transparent material 4 in the feed line 3 on the surface wetted by the silicone material. During the demolding of the preform, the cured silicone material detaches sufficiently well in this region of the feed line 4 to ensure a clean surface for the following silicone material.

Figure 4:
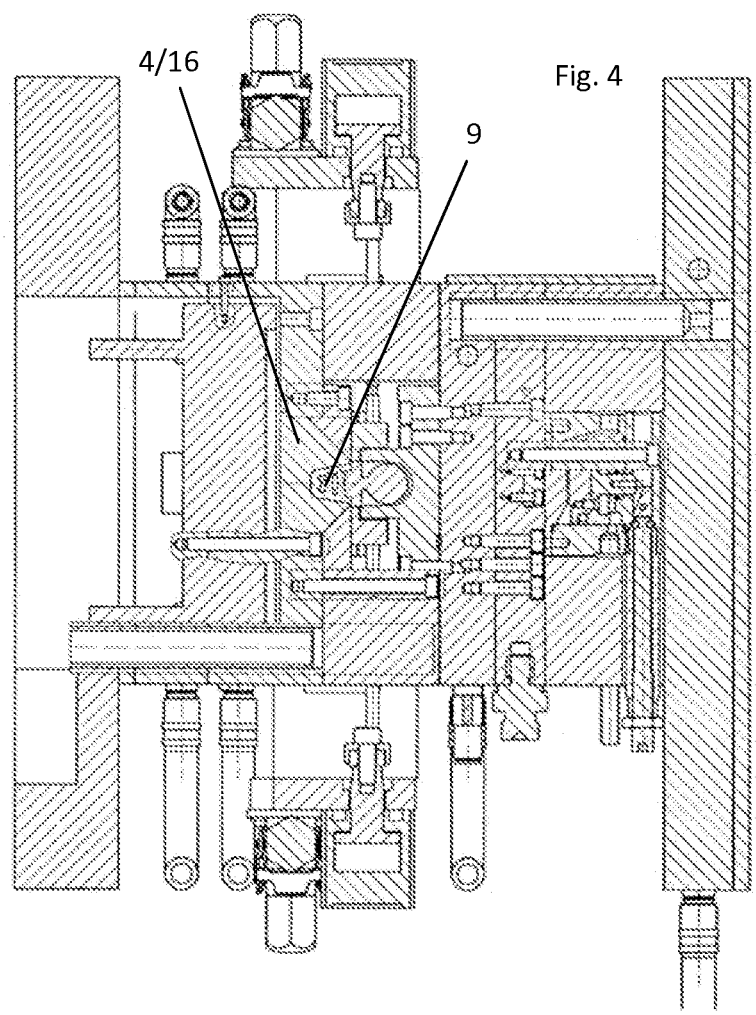
FIG. 4 illustrates a possible embodiment of a retrofitted, conventional injection-molding tool.

The basic idea of the device in accordance with embodiments of the invention can also be employed very well for retrofitting existing injection-molding machines, as were heretofore used for processing temperature-cross-linked silicone material. A conventional tool of a conventional injection-molding machine is illustrated in FIG. 4, wherein a part 16 of the mold cavity 1 on the output side is replaced by a transparent material 4, however. The corresponding part of the cavity is formed here by a preform 9 made of a cured thermoplastic material, which protrudes partially into the cavity of the transparent material 4 and is sheathed by the silicone material, or also penetrated in boreholes, respectively, before the silicone material cross-links due to the activation via radiation sources 5, which are located inside pocket holes 12 in the transparent material 4. The production of a light-activated silicone molded part without molded thermoplastic material 9 is also possible using this device, of course.

Figure 5:
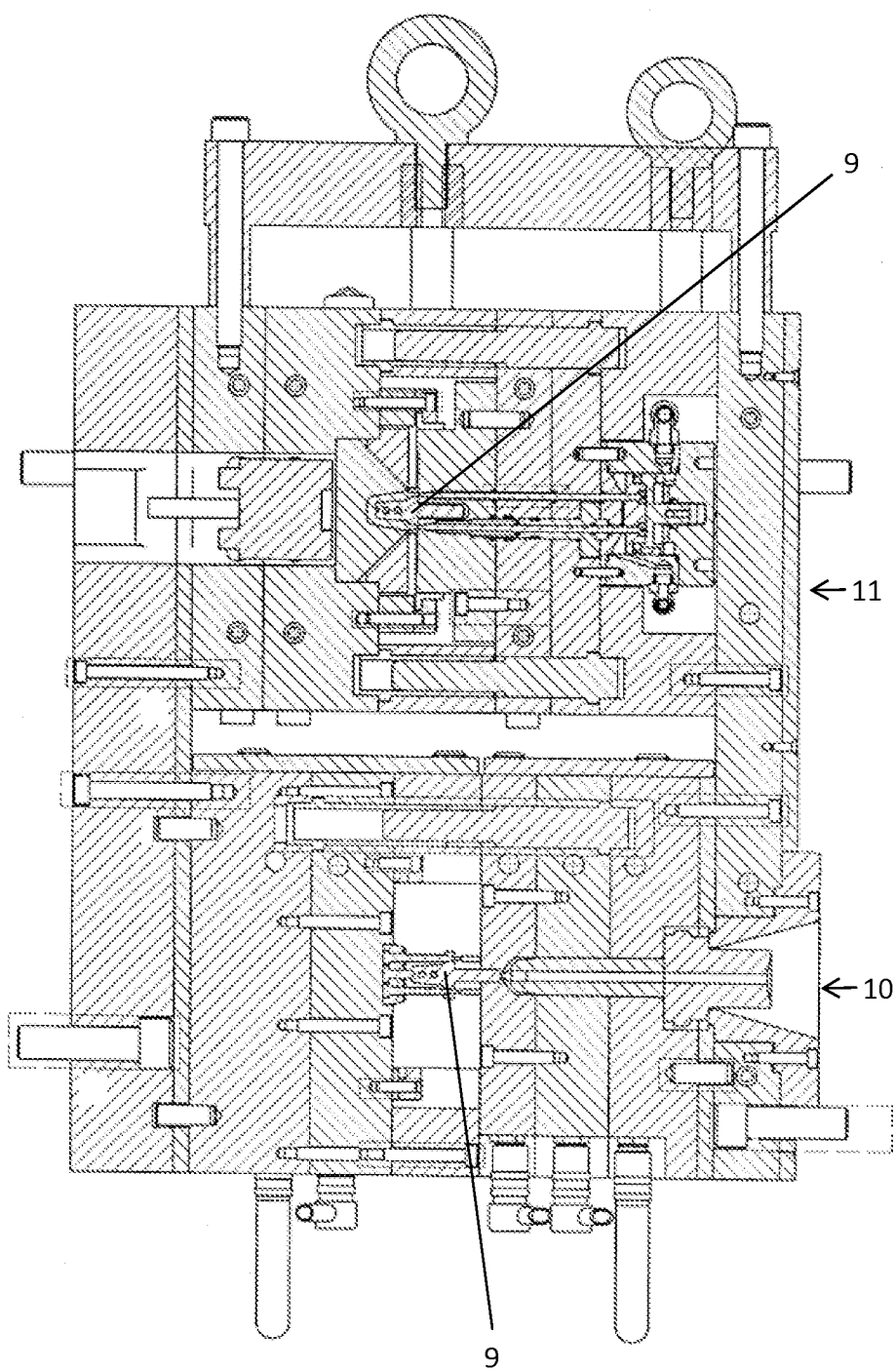
FIG. 5 illustrates the device of FIG. 4 in combination with an injection-molding tool for producing thermoplastic preforms.

FIG. 5 illustrates the device from FIG. 4 in combination with an injection-molding tool for producing thermoplastic materials. The thermoplastic material 9 is molded here in a first injection-molding tool 10 and, after the opening of the mold cavity, removed via a device (not illustrated here), for example, a gripper, and placed in a second injection-molding tool 11, where it is partially sheathed with the light-activatable silicone after the subsequent closing of the mold cavity 1.

Figure 6:
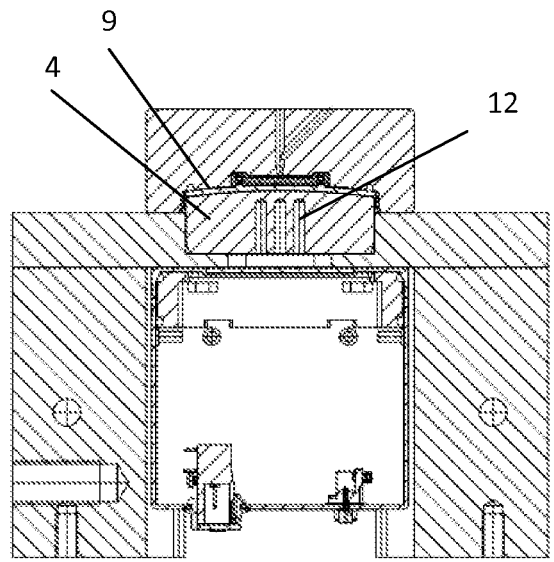
FIG. 6 illustrates a detail view of an alternative embodiment of FIG. 4 for bonding a thermoplastic preform with light-activatable silicone.

FIG. 6 illustrates a detail view in section of a device corresponding to FIG. 4, however, for another thermoplastic material 9. The sectional plane is arranged here in such a way that the pocket holes 12 inside the transparent material 4 are better recognizable. The thermoplastic material 9 covers and partially encompasses the transparent material 4, the silicone reaches the mold cavity 1 via the injection line 17 and is light activated inside the mold cavity 1, wherein the activating light first shines through the thermoplastic material 9.

Figure 7:
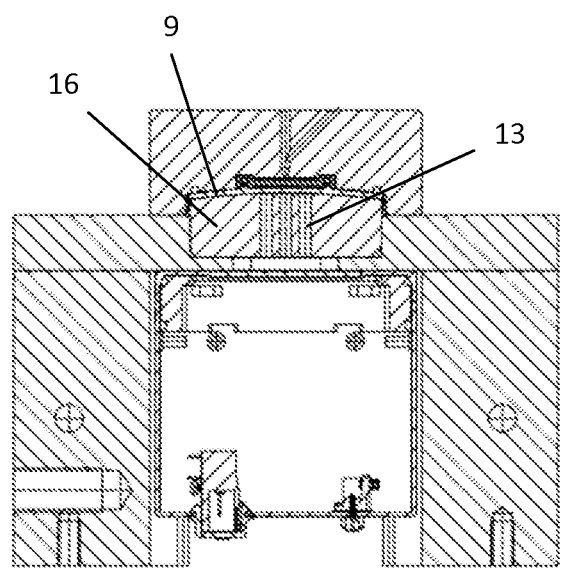
FIG. 7 illustrates a further alternative embodiment of the device of FIG. 4 or FIG. 6.

In a refinement in accordance with embodiments of the invention of the device of FIG. 6, which is illustrated in FIG. 7, the radiation sources are arranged inside passages 13, which completely penetrate a part 16 of the mold cavity 1, wherein a thermoplastic material 9 is provided, which in turn fills up a partial region of the cavity and covers the passages 13. In this way, the distance to be radiated through by the light-emitting point up to the silicone material is reduced once again. This variant results in further optimization of the light yield. In this variant, the part 16 of the mold cavity 1 can be manufactured from conventional, non-transparent material.

In a preferred further embodiment variant, transparent lenses 14, which close the passages 13, are located at one end of the passages 13. The part 16 of the mold cavity 1 can also be manufactured from conventional, nontransparent material in this variant.

In addition, it is possible in a further variant of the invention to manufacture the region of the feed line 3 entirely from conventional, non-transparent material, wherein the passages 13, closed by transparent lenses 14, are arranged in a component which is in the place of the transparent material 4.

The transparent lenses 14 can be manufactured either from glass or from a transparent plastic, their surface wetted by the silicone material can be completely planar or can have a surface roughness according to VDI in a range from 21 ra to 27 ra.

The light-emitting radiation source 5 is preferably an LED lamp having a power consumption in range of between 1 to 20 W, which emits light in the visible and/or in the UV range. Depending on the type of the silicone product and the applied method, one LED lamp or a plurality of LED lamps is arranged in the feed line 3 and/or in the part 16 of the mold cavity 1, wherein a plurality of LED lamps are distributed to cover the area. Instead of LED lamps, it is also conceivable to use other lamps or optical waveguides, which represent a substantially spot-shaped radiation source 5.

A particular advantage of the present invention is that the cross-linking of liquid silicone materials is carried out with a substantially lower power expenditure, since in the case of previous thermally cross-linked silicone materials, the tool or the mold cavity had to be kept at a temperature in a range of between 180° C. to 220° C., while in contrast in the case of temperature-optimized, light-activated cross-linking, the liquid silicone material is only heated to a temperature in a range of between 35° C. to 75° C. It is particularly advantageous that due to the arrangement of the light-emitting point of the radiation source 5 inside a pocket hole 12 or inside a passage 13, the radiation source 5 is positioned very close to the silicone material, whereby the light yield is optimized.

A further advantage is that it is possible using the present invention in a relatively simple manner to refit the injection-molding machines for high-temperature cross-linking, which are present worldwide in operations which process silicone, for the novel radiation-cross-linking technology, in that a temperature control unit is installed in the feed to the injection nozzle or this temperature control unit is already combined with the static mixer, and either a part 16 of the metallic mold cavity parts are replaced with transparent mold cavity parts 4 and the light-emitting points of radiation sources 5 are arranged inside pocket holes 12 of these mold cavity parts 4, or a feed line 3 having a region made of transparent material 4 is provided between the injection nozzle and immediately before the metallic mold cavity, wherein again the light-emitting points of the radiation source 5 lie inside pocket holes 12 or passages 13.

It is particularly advantageous that the heretofore required heaters in the tool can be omitted entirely, whereby the production of the tool is substantially simpler.

Furthermore, it is advantageous that because of the relatively low silicone temperature of less than 80° C., no undesired shape change of the thermoplastic material is to be feared in the case of sheathing of thermoplastic plastics with silicone materials.

The greatest advantage is that, however, it is very advantageously possible for the first time using the present invention to produce low temperature-resistant thermoplastic preforms in an injection-molding machine and to at least partially sheath them with cross-linked silicone immediately after they are cured, as illustrated in FIG. 5, in an adjacent mold cavity.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus configured to process a liquid, light-activatable silicone material of low viscosity, comprising:
   a mold cavity;
   a feed line fluidically connected at one end to one or more storage containers for the liquid, light-activatable silicone material of low viscosity and at another end to the mold cavity;
   a temperature control unit to control the temperature of the liquid, light-activatable silicone material,
   wherein a region of the feed line directly adjoins the mold cavity and is widened and flattened out, at least a part of the flattened region of the feed line comprises a transparent material that includes pocket holes, and one or more radiation sources configured to provide ultraviolet or visible light are provided inside the pocket holes in the transparent material.

2. The apparatus of claim 1, wherein the feed line comprises a nontransparent material, and one or more radiation sources configured to provide ultraviolet or visible light are provided inside passages in the mold cavity and/or in the feed line, and the passages are closed at one end by inserted lenses or by a molded thermoplastic material in the mold cavity.

3. The apparatus of claim 2, further comprising a static mixer, wherein the temperature control unit has a passage channel for the silicone material and is arranged around the static mixer.

4. The apparatus of claim 3, further comprising:
a material pressure delimiters provided in the feed line to the mold cavity to regulate pressure; and
a screen adapter to separate out non-liquid or viscous components in the liquid, light-activatable silicone material.

5. The apparatus of claim 4, wherein:
a free cross-sectional area of the feed always remains equal.

6. The apparatus of claim 5, wherein the flattened region of the feed line is dimensioned in such a manner that the thickness of the liquid, light-activatable silicone material to be radiated through in the flattened region of the feed line is not greater than 3 mm.

7. The apparatus of claim 6, wherein the transparent material comprises a polymethyl methacrylate.

8. The apparatus of claim 6, wherein a shaping surface of the transparent material of the mold cavity has a rough surface structure.

9. The apparatus of claim 8, wherein:
the surface roughness of the transparent material of the mold cavity is in a range of between 21 ra to 27 ra; and
the size of the surface roughness of the transparent material of the mold cavity is in a range of between 1.1 µm and 2.2 µm.

10. The apparatus of claim 2, wherein the lens comprises glass or a transparent plastic.

11. The apparatus of claim 1, wherein the radiation source comprises an LED lamp.

12. The apparatus of claim 11, wherein the LED lamp has a power consumption in a range of between 1 to 20 W.

13. An injection-molding machine having an injection-molding tool for the production of molded silicone products from light-activatable silicone materials of low viscosity, comprising:
a mold cavity;
a feed line fluidically connected at one end to one or more storage containers for the liquid, light-activatable silicone material of low viscosity and at another end to the mold cavity;
a temperature control unit to control the temperature of the liquid, light-activatable silicone material;
wherein a region of the feed line directly adjoins the mold cavity and is widened and flattened out, at least a part of the flattened region of the feed line comprises a transparent material that includes pocket holes, and one or more radiation sources configured to provide ultraviolet or visible light are provided inside the pocket holes in the transparent material.

14. The injection-molding machine of claim 13, further comprising:
a first injection-molding tool configured to produce molded thermoplastic materials;
a second injection-molding tool which is temperature-insulated from the first injection-molding tool, and configured to at least partially sheath the molded thermoplastic materials using a light-activatable silicone material; and
transfer devices configured to transfer the molded thermoplastic materials from the first injection-molding tool to the second injection-molding tool.

* * * * *